Dec. 5, 1967 R. M. VOITIK 3,356,377
FLUID SEALING ASSEMBLY WITH RESILIENT SEALING RINGS
Filed Aug. 13, 1965 2 Sheets-Sheet 1
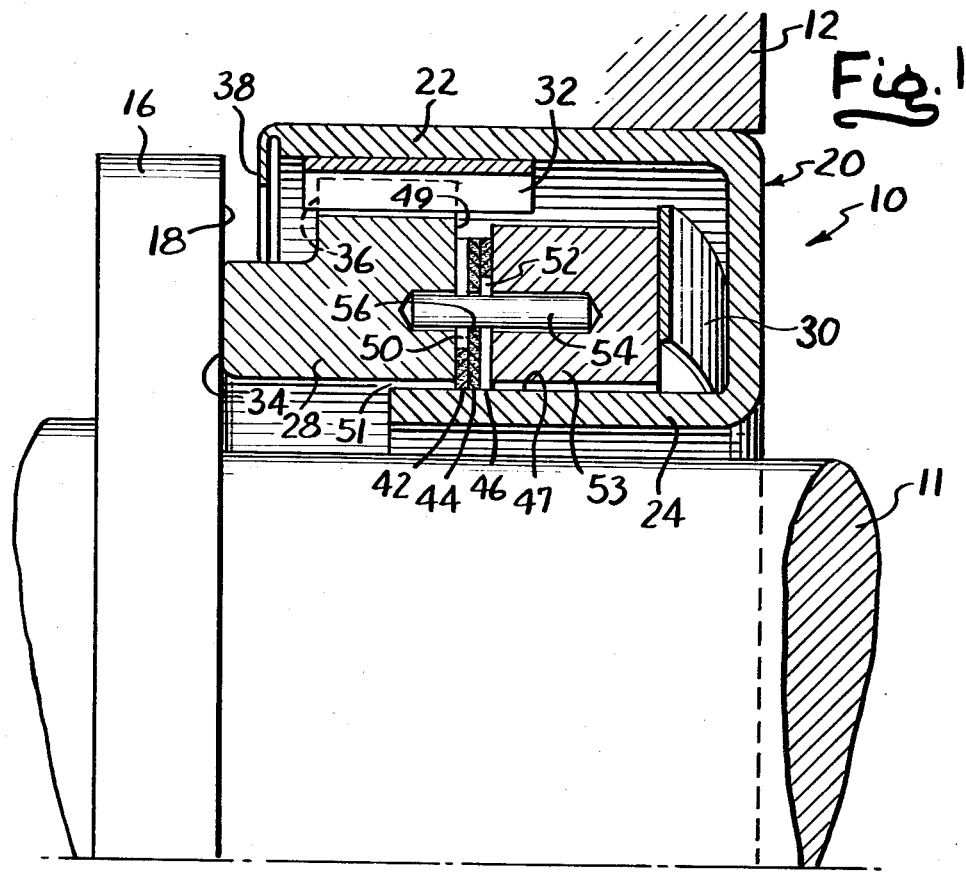
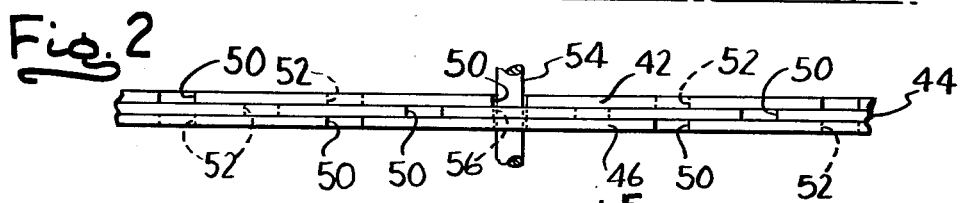
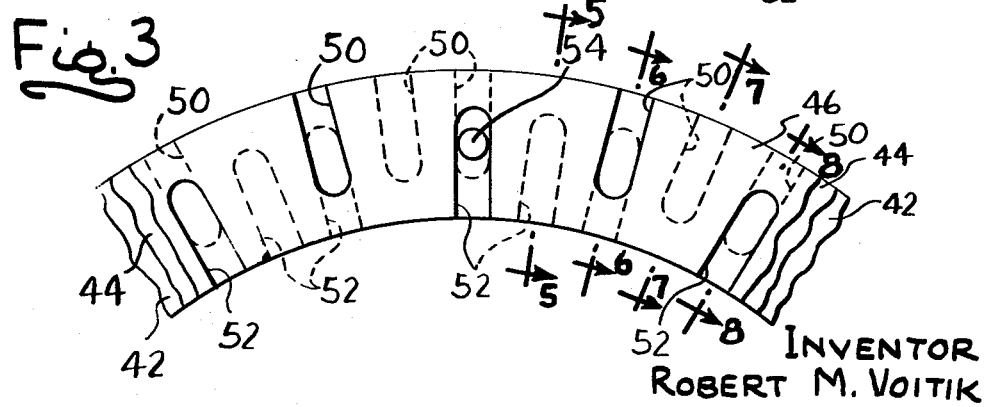
INVENTOR
ROBERT M. VOITIK
by: Wolfe, Hubbard, Voit & Osann
ATTYS.

Dec. 5, 1967   R. M. VOITIK   3,356,377
FLUID SEALING ASSEMBLY WITH RESILIENT SEALING RINGS
Filed Aug. 13, 1965   2 Sheets-Sheet 2
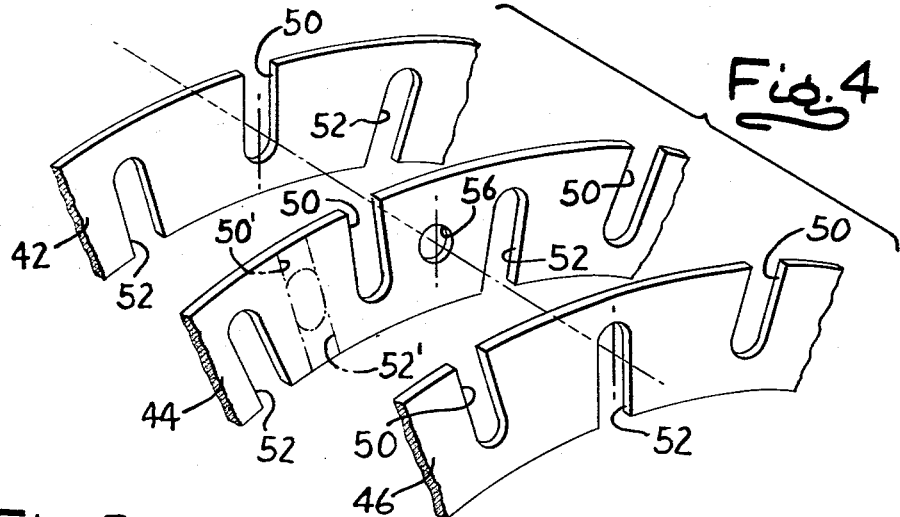
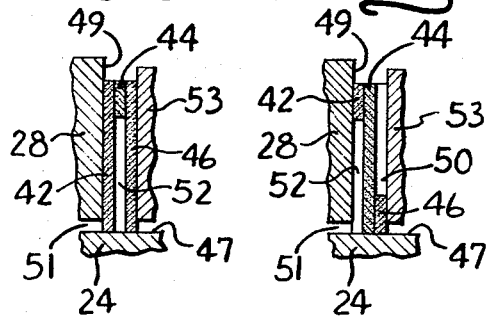
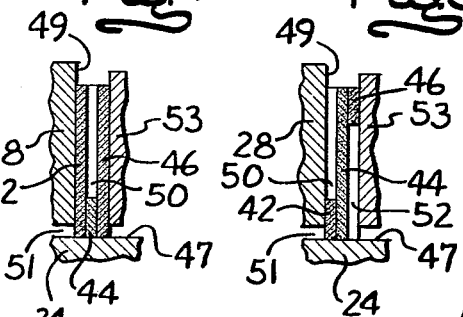
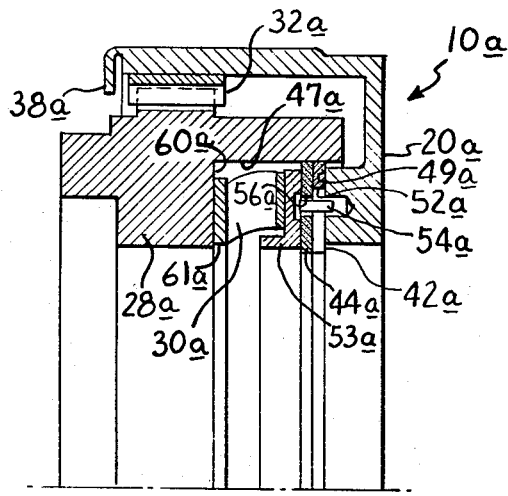
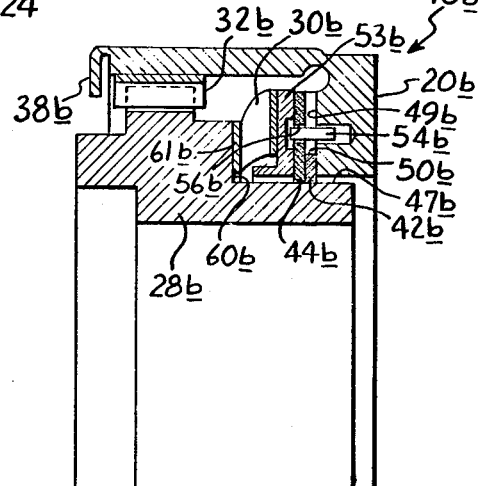
INVENTOR
ROBERT M. VOITIK
by: Wolfe, Hubbard, Voit & Osann
ATTYS.

United States Patent Office 3,356,377
Patented Dec. 5, 1967

3,356,377
FLUID SEALING ASSEMBLY WITH RESILIENT SEALING RINGS
Robert M. Voitik, Glenview, Ill., assignor to Continental Illinois National Bank and Trust Company of Chicago, trustee
Filed Aug. 13, 1965, Ser. No. 479,515
7 Claims. (Cl. 277—40)

ABSTRACT OF THE DISCLOSURE

A rotary face seal assembly having flat annular sealing rings each formed with a plurality of notches in their inner and outer edges which impart resiliency to the rings, permitting the rings to expand and contract slightly while remaining flat and to maintain a sealing contact with an annular sealing surface although the annular surface is skewed or not exactly parallel to the ring sealing surfaces.

---

The present invention relates to rotary face seals and more particularly to an assembly useful as the secondary seal in a rotary seal.

If a seal is to be subject to high temperatures or corrosive fluids it is desirable to avoid the use of organic material, natural or synthetic, in making the seal. On the other hand, non-organic seals previously have been subject to the defects of fatigue and inflexibility under stress. The rotor and stator defining the primary seal of a face seal are normally non-organic, but the operational demands on the so-called secondary seal have made it difficult to avoid organic O-rings and the like when designing a face seal.

Accordingly, it is an object of the invention to provide a novel, non-organic secondary seal which allows for free axial movement. It is another object to provide a seal of the above type which is not only capable of resisting high temperatures but which also is not subject to stress fatigue or differential expansion failure. More specifically, it is an object of the invention to provide a flexible secondary seal which does not utilize O-rings or split rings, or material made from natural or synthetic organic material, but which may be of the same material as the surface on which it bears.

It is a related object to provide a compact and inexpensive rotary face seal having the above characteristics.

It is still an additional object to provide a secondary seal which remains effective even when there is slight skewing of the primary seal parts.

It is a further object to provide a seal structure of the above character which functions effectively as a primary seal for parts having both axial and rotational movement.

Other objects and advantages of the invention will become apparent upon reading the following detailed discussion and upon reference to the attached drawings, in which:

FIGURE 1 is an axial section of a seal constructed according to the invention and installed in a shaft assembly;

FIG. 2 is a fragmentary end elevation of the secondary sealing elements in the seal of FIG. 1;

FIG. 3 is a fragmentary bottom plan of the elements shown in FIG. 2;

FIG. 4 is an exploded fragmentary perspective of some of the elements shown in FIGS. 2 and 3;

FIGS. 5, 6, 7 and 8 are fragmentary sections taken approximately along the lines 5—5, 6—6, 7—7 and 8—8, respectively, in FIG. 3;

FIG. 9 is a section similar to FIG. 1 showing another embodiment of the invention; and FIG. 10 is a section similar to FIGS. 1 and 9 showing still another embodiment of the invention.

While the invention will be described in connection with certain preferred embodiments, it will be understood that I do not intend to limit the invention to those described. On the contrary, I intend to cover all alternatives, modifications and equivalents as may be included within the spirit and scope of the invention as defined by the appended claims.

Turning now to the drawings, FIG. 1 illustrates a rotary seal 10 constructed according to the invention and arranged to seal an annular space along a shaft 11 that is mounted for rotation and extended through the wall of a pressurized housing 12. Fixed to the shaft 11 is a rotor 16 having a rotary sealing face 18 extending radially. Fixed to the housing 12 is a cup or casing 20 which has two cylindrical portions 22 and 24 defining an annular chamber or groove 26. Carried within the annular groove is an annular stator 28 having a front sealing face 34. The faces 18, 34 are kept in sealing engagement by a spring 30 disposed within the chamber 26 to urge the stator 28 towards the motor 16. The stator is keyed against rotation by a slot 36 which registers with an anchor 32 fixed on the cylindrical portion 22. The anchor 32 allows the stator 28 free axial movement, and the stator is kept within the cup or casing by a lip 38 on the portion 22.

In accordance with the invention, a plurality of non-organic notched rings 42, 44 and 46 are arranged to cooperate with a cylindrical surface 47 on the casing 20 and an annular surface 49 on the stator 28 so as to establish a secondary seal closing a gap 51 between the stator and the surrounding casing. Preferably, the rings 42, 44, 46 are formed of carbon and are flat, thin, and flexible, the thickness of the rings being substantially less than the radial width of the flat faces of the rings. A plurality of notches 50 are formed in the rings from their outer edges and a plurality of notches 52 are formed extending from the inner edges of the rings. The notches 50, 52 occur alternately about the rings so as to give the rings radial resilience. That is, the rings can be slightly expanded or contracted radially from their relaxed state while remaining flat and with the resilience of the material developing a force tending to return the rings to their relaxed sizes.

To establish the secondary seal in the seal 10, the ring 42 is fitted flatly against the annular surface 49 and is expanded slightly so that its inner edge resiliently engages the cylindrical surface 47. The ring 44 is fitted flatly against the ring 42 and is also slightly expanded radially so that its inner edge resiliently engages the surface 47. In this embodiment, the ring 46 is a third ring engaging the surface 47 and flatly held against the ring 44. In the illustrated arrangement, an annular member 53 is interposed between the spring 30 and the rings 42, 44, 46 so that the rings are sandwiched between the stator 28 and the member 53 with the force of the spring 30 holding the rings 42, 44, 46 in position.

The ring 42 seals the gap 51 except for the openings created by the notches 52 from the inner edge of the ring. The notches 50 leave an unnotched radial dimension, that portion of the ring 42 sectioned in FIG. 1, that is greater than the radial dimension of the gap 51. The ring 44 is peripherally offset with respect to the ring 42 so that the notches 50, 52 are out of alignment, thus precluding the existence of an axially extending opening through the rings along the surface 47. As seen in FIG. 4, the notch 52 in the ring 42 falls approximately along the dashed line 52′ when the rings 42, 44 are sandwiched. In this embodiment, the third ring 46 is again offset so that its notches are out of alignment with the notches in the ring 44. Hence, the notch 50 in the ring 46 shown in FIG. 4 falls approximately along the washed line 50' when the rings are pressed together.

In order to hold the rings 42, 44, 46 against relative annular movement so that their notches remain out of alignment, a pin 54 is passed through the rings and is anchored in holes formed in the stator 28 and the member 53. Since the ring notches in adjacent rings are out of alignment, a hole 56 is formed in the ring 44 to receive the pin 54. It should also be noted that the pin 54 passes through one of the notches 50 in the ring 42 since the outer edge of the ring is not in engagement with the surface 47 against which the rings seal. Aligning the hole 56 with one of the notches 52 in the ring 42 would create a leakage path through the rings.

Since the rings 42, 44, 46 are thin and flexible, the secondary seal they establish remains effective when the stator skews slightly within the casing 20. The flexibility of the rings compensates when the surface 49 is not truly normal to the surface 47. The light resilience with which the inner edges of the rings engage the surface 47 maintains a good seal against the surface and allows free axial movement of the stator within the limits imposed by the spring 30 and the lip 38. If desired, the natural resilience of the rings can be augmented by a radially acting spring mechanism. The slight radial movement permitted the stator 28 within the casing 20 also does not break the secondary seal established by the rings 42, 44, 46 as the surface 49 remains in sealing engagement with the abutting ring 42.

In FIGS. 9 and 10, alternate embodiments of the invention are illustrated with parts corresponding to those previously described having the same reference numerals to which the distinguishing suffixes "a" and "b," respectively have been added. Thus, a seal 10a is shown in FIG. 9 having a stator 28a fitted within a casing 20a and locked against angular movement by an anchor 32a. A biasing spring 30a urges the stator 28a outwardly of the casing 20a. A turned down lip 38a on the casing 20a prevents separation of the stator 28a from the seal assembly.

In carrying out the invention, the stator 28a is formed with an annular groove 60 defining a cylindrical surface 47a disposed adjacent to and generally perpendicular of an annular surface 49a formed on the casing 20a. A pair of rings 42a and 44a are fitted within and in sealing engagement with the surface 47a. The spring 30a is disposed between a washer 61 abutting the stator 28a and an anular member 53a sandwiching the rings 42a, 44a against the casing surface 49a.

The rings 42a, 44a are notched as are their counterparts 42, 44, and are slightly compressed radially so that they bear resiliently on the surface 47a. The rings are held against angular movement with their notches out of alignment by a pin 54a fitted between holes in the member 53a and the casing 20a. The pin 54a passes through a hole 56a in the ring 44a and through a notch 52a in the ring 42a. The function of the rings 42a, 44a in cooperating with the annular surface 49a and the cylindrical surface 47a is as described above in connection with the corresponding parts in the seal 10, the only distinction lying in the fact that the surface 47a is an inner cylindrical surface whereas the surface 47 is an outer cylindrical surface. It should also be noted that the pin 54a passes through a notch 52a extending from the inner edge of the ring 42a since the outer edge of this ring is in sealing engagement with the surface 47a.

The provision of the groove 60 in the stator 28a, within which the rings 42a, 44a and the spring 30a can be disposed, produces a particularly compact construction. Also, in this embodiment of the invention, the rings 42a, 44a and the stator 28a can advantageously be made of the same material, such as carbon, so that the rings and the stator have the same coefficient of thermal expansion. Thus, under elevated operating temperatures, the thermal expansion of the surface 47a is identical to the thermal expansion of the rings 42a, 44a.

A seal 10b is shown in FIG. 10 having a stator 28b fitted within a casing 20b and anchored against angular movement by an anchor 32b. A biasing spring 30b urges the stator 28b toward the left in the drawing and a lip 38b prevents the stator from slipping out of the casing 20b.

As in the FIG. 9 embodiment, the stator 28b is formed with an annular groove 60b which defines a cylindrical surface 47b disposed adjacent to and generally perpendicular of an annular surface 49b on the casing 20b. A pair of rings 42b and 44b are fitted resiliently about the surface 47b and the spring 30b, interposed between a washer 61b and an annular member 53b, acts to hold the rings 42b, 44b, flatly together and against the annular surface 49b.

As in the previously discussed embodiments, the rings 42b, 44b are notched and formed of thin, flexible material. The rings are held against angular movement with their notches out of alignment by a pin 54b fitted between holes in the casing 20b and the member 53b. The pin 54b passes through a hole 56b in the ring 44b and a notch 50b formed in the ring 42b. The function and advantages of the seal 10b obviously correspond to those previously discussed in connection with the seals 10 and 10a.

It can now be seen that a novel, non-organic secondary seal has been provided which allows free axial movement of a stator within its supporting casing. The notched rings of the invention effectively provide a fluid seal across a gap existing between a cylindrical surface and an adjacent annular surface. It will thus be apparent that the notched rings of the invention, arranged in the manner described above, could also be utilized to provide an effective primary seal between an element having an annular surface and an adjacent, relatively movable element defining a cylindrical surface.

Since the notched rings of the invention can be formed of material such as carbon, the secondary seal of the invention is capable of withstanding extremely high temperatures. The secondary seal is not subject to stress fatigue or differential expansion failure as is often the case with bellows and similar constructions.

Those skilled in the art will also appreciate that the secondary sealing parts described above can be quite economically formed and assembled. Their configuration also permits a particularly compact overall seal design.

I claim as my invention:

1. In a seal assembly, the combination comprising, a first member defining a cylindrical surface, a second member defining an annular surface disposed generally radially of said cylindrical surface and spaced therefrom to create an intervening gap, a first annular ring fitted flatly against said annular surface with an edge of the ring engaging said cylindrical surface, said ring being formed with a plurality of notches extending from both its inner and outer edges so as to impart radial resilience to the ring, said notches leaving an unnotched radial dimension that is greater than the radial dimension of said gap, a second annular ring fitted flatly against said first ring with an edge of the ring engaging said cylindrical surface, said second ring also being formed with a plurality of notches extending from both its inner and outer edges so as to impart radial resilience to the ring, said notches in said rings being disposed out of alinement to preclude the existence of an axially extending opening through said rings along said cylindrical surface, means for urging said rings together and against said annular surface, and means for holding said rings against relative angular movement.

2. The combination of claim 1 in which said last named means comprises a pin extending axially through said rings with the pin passing through one of said first ring notches that extends from the ring edge not in engagement with said cylindrical surface.

3. In a seal assembly, the combination comprising, a first member defining a cylindrical surface, a second member defining an annular surface disposed generally radially of said cylindrical surface and spaced therefrom to create an intervening gap, a first annular ring fitted flatly against said annular surface with an edge of the ring engaging said cylindrical surface, said ring being formed with a plurality of notches extending from both its inner and outer edges so as to impart radial resilience to the ring, a second annular ring fitted flatly against said first ring with an edge of the ring engaging said cylindrical surface, said second ring also being formed with a plurality of notches extending from both its inner and outer edges so as to impart radial resilience to the ring, said rings being formed of thin flexible material, said notches in said rings being disposed out of alinement to preclude the existence of an axially extending opening through said rings along said cylindrical surface, means for urging said rings together and against said annular surface, and means for holding said rings against relative angular movement.

4. A rotary face seal comprising, in combination, an annular stator, a casing surrounding said stator and defining an annular surface adjacent said stator, said stator having an annular groove defining a cylindrical surface disposed closely adjacent to and generally perpendicular of said annular surface, a pair of flat annular rings disposed in said groove with edges engaging said cylindrical surface, means interposed between said stator and said rings for urging said rings together and against said annular surface, said rings being formed with a plurality of notches so as to impart radial resilience thereto, notches and said rings being disposed out of alinement to preclude the existence of an axially extending opening through said rings along said cylindrical surface, and means for holding said rings against relative angular movement.

5. A rotary face seal comprising, in combination, an annular stator, a casing surrounding said stator and defining an annular surface adjacent said stator, said stator having an annular groove defining a cylindrical surface disposed closely adjacent to and generally perpendicular of said annular surface, a pair of flat annular rings disposed in said groove with edges engaging said cylindrical surface, means interposed between said stator and said rings for urging said rings together and against said annular surface, said rings being notched from both their inner and outer edges so as to impart radial resilience thereto, said stator and said rings being formed of material having substantially the same coefficient of thermal expansion, said notches in said rings being disposed out of alinement to preclude the existence of an axially extending opening through said rings along said cylindrical surface, and means for holding said rings against relative angular movement.

6. A rotary face seal comprising, in combination, a stator defining a primary sealing surface, a casing surrounding said stator, said stator and said casing defining a pair of secondary sealing surfaces including a cylindrical surface and an annular surface disposed generally radially of said cylindrical surface, a first annular ring fitted flatly against said annular surface with an edge of the ring engaging said cylindrical surface, a second annular ring fitted flatly against said first ring with an edge of the ring engaged said cylindrical surface, said rings being notched from both their inner and outer edges so as to impart radial resilience thereto, said notches in said rings being disposed out of alinement to preclude the existence of an axially extending opening through said rings along said cylindrical surface, means for urging said rings together and against said annular surface, and means for holding said rings against relative angular movement.

7. A rotary face seal comprising, in combination, a stator defining a primary sealing surface, a casing surrounding said stator, said stator and said casing defining a pair of secondary sealing surfaces including a cylindrical surface and an annular surface disposed generally radially of said cylindrical surface, a first annular flexible ring fitted flatly against said annular surface with an edge of the ring engaging said cylindrical surface, a second annular flexible ring fitted flatly against said first ring with an edge of the ring engaging said cylindrical surface, said rings being notched from both their inner and outer edges so as to impart radial residience thereto, said notches in said rings being disposed out of alinement to preclude the existence of an axially extending opening through said rings along said cylindrical surface, means for urging said rings together and against said annular surface, and a pin extending axially through said rings with the pin passing through one of said first ring notches that extends from the ring edge not in engagement with said cylindrical surface.

References Cited

UNITED STATES PATENTS

| 2,889,159 | 6/1959 | Jensen | 277—40 |
| 2,908,516 | 10/1959 | Stein | 277—137 |
| 3,235,274 | 2/1966 | Cain et al. | 277—156 |

SAMUEL ROTHBERG, *Primary Examiner.*